April 8, 1969   D. W. RAHMES   3,436,978
POWER TRANSMISSION BELT
Filed June 8, 1967
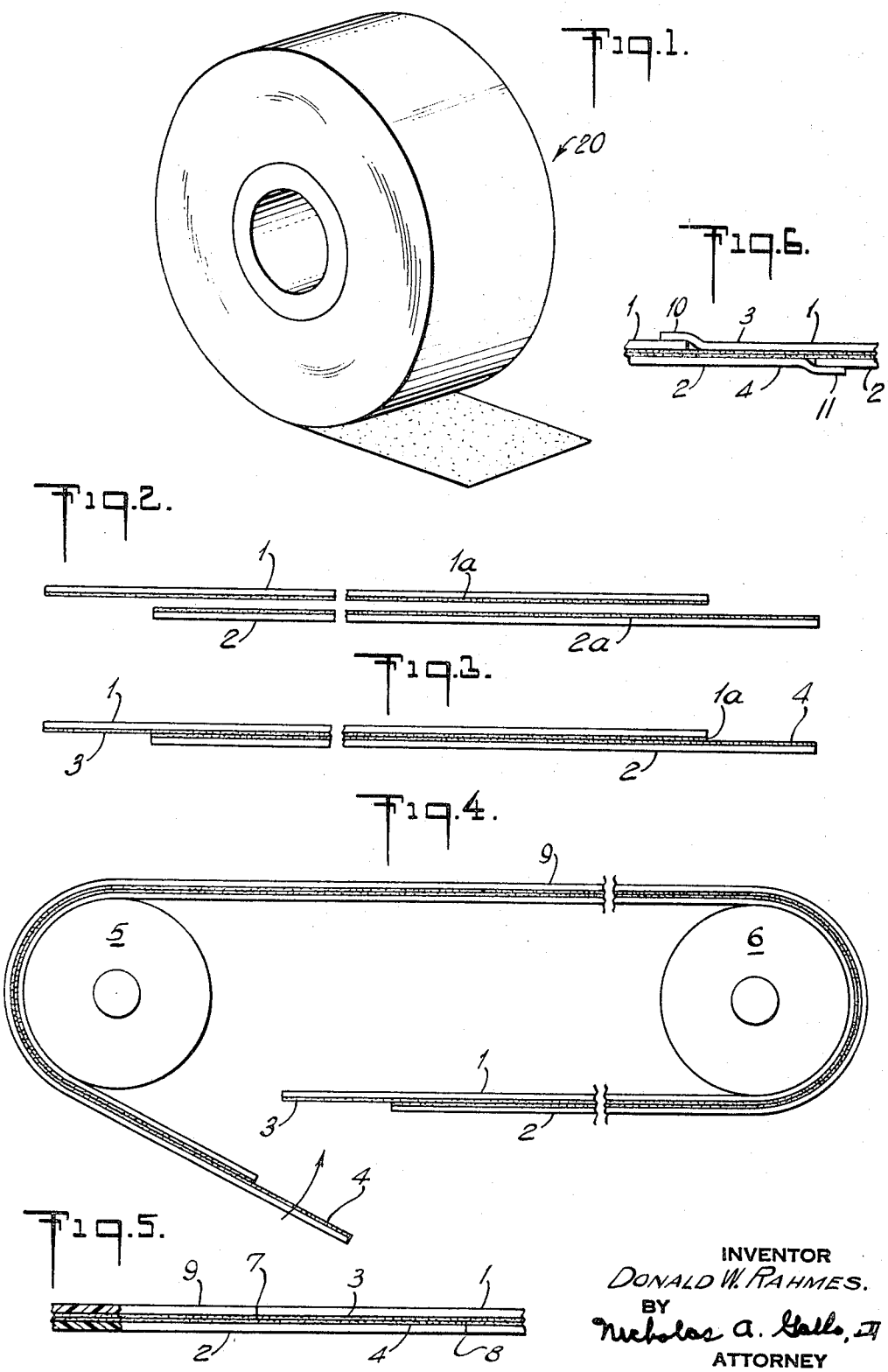
INVENTOR
DONALD W. RAHMES.
BY
Nicholas A. Gallo, Jr
ATTORNEY 3,436,978
POWER TRANSMISSION BELT
Donald W. Rahmes, Hinsdale, Ill., assignor to Johnson & Johnson, a corporation of New Jersey
Filed June 8, 1967, Ser. No. 644,664
Int. Cl. F16g 1/26
U.S. Cl. 74—232                    3 Claims

ABSTRACT OF THE DISCLOSURE

A power transmission or conveyor belt is constructed from two substantially identical segments of pressure sensitive tape that are positioned one on top of the other in offset lengthwise relationship with the adhesive coatings in intimate face-to-face contact to thus form a laminate with opposing adhesive tabs at the ends thereof. The belt is completed by placing the laminate around a set of pulleys and pressing the tabs together.

BACKGROUND OF THE INVENTION

Belt installation

When due to fatigue, it is necessary to replace power transmission or conveyor belts, some difficulty and much inconvenience is usually encountered. Because of the diversity of belt size and surface characteristics required by the various machines in a large scale industrial complex, a varied, expensive and space consuming stock of belts of all conceivable sizes and surface characteristics must be kept on hand. When replacement is necessary, the proper belt must first be selected, and then applied to the machine. This latter step is more difficult than may be apparent especially if the machine does not have a clutch release mechanism, it being necessary to temporarily stretch the belt to pass it around the pulleys that the belt is designed to fit snugly.

Therefore, it has long been desirable to provide a roll of continuous belting material from which lengths may be severed as required and spliced to provide belts of various sizes. Rolls of belting material have been available, as shown, for example, by Gringas Patent 385,613, however, in order to fashion a severed length of such material into a belt, it is necessary to bevel opposing surfaces of opposite ends of the severed strip and then fasten these ends together by sewing or the like. It was therefore still necessary to either stretch a pre-formed belt around the pulleys or attempt difficult in situ splicing at the machine site. The art still lacked a simple method of in situ custom belt formation, especially from conventional materials that might be on hand.

Belt characteristics

In addition, belts formed from prior art rolls of belting material have stiffness, weight, and thickness characteristics in the area of the joint or splice which differed materially from those of the remainder of the belt. In most cases, the splice is stiffer, thicker and heavier. This is true even with plied belts since the materials and means of lamination of the components in the factory differed of necessity from splicing techniques and materials used at the machine site. This difference in characteristics and properties made impossible smooth and regular power transmission especially between small diameter pulleys. With factory pre-formed belts this problem was not as serious due to better matching of characteristics at the time of manufacture. However, matching was not complete even where adhesives were used to both laminate the belt plies together and form the splice since the adhesives used for lamination were not considered strong enough for splicing. Instead, for splicing, rigid cements or stitching was used.

A further deficiency of prior art belts is that they stretch excessively during use. It was virtually essential that elastomeric materials be used to form the belts since the belts had to be stretched in order to install the same. But on the other hand, stretching during use results in slippage which in turn leads to complications obvious to one skilled in the art. Prior art belts were also heavier in weight, thicker and stiffer than desired, the same being made of leather or rubber for strength.

Objects of the invention

It is therefore one object of this invention to provide a simple method of forming power transmission and conveyor belts at the machine site and preferably in situ on the machine from conventional materials readily available and usable with a minimum of advance planning.

It is a second object of this invention to provide power transmission and conveyor belts which are essentially uniform along their entire length and which are thin and light in weight.

THE INVENTION IN GENERAL

According to the method provided by this invention, the belts may be formed at the machine site from a conventional adhesive tape, preferably pressure sensitive adhesive tape. From the roll, two segments of tape, preferably equal in length, are severed and disposed congruently widthwise and in offset relationship lengthwise with the adhesive coatings in intimate face-to-face contact and adhered together to provide a laminate having opposing facing adhesive tabs at the ends of the same. The laminate is then placed around the pulleys between which it is desired to transmit power and the opposing tabs adhered together to complete the belt. The method may also be used with one segment of adhesive tape and one segment of nonadhesive tape.

The belts thus formed may be light in weight and thin and quite flexible. In addition, if the tape segments are of equal length and the laminate tabs disposed in congruent relationship, the belts are homogeneous along their entire length since the splice is a parallel splice and since the adhesive utilized in the splice area is the same and is present at the same weight as that used in the remainder of the belt.

THE INVENTION IN DETAIL

The invention may be more easily understood from the attached drawings when examined in conjunction with the following description. In the drawings, FIG. 1 is a view in perspective of a tape roll;
FIG. 2 is a cross section of a partially formed belt of this invention;
FIG. 3 illustrates the second step in the formation of power transmission belts according to this invention;
FIG. 4 illustrates the final step in the belt formation;
FIG. 5 shows the splice area of a completed belt;
FIG. 6 shows the splice area of still another belt.

Method of forming belts

As previously stated, two lengths of pressure sensitive adhesive tape, 1 and 2, are severed from a roll 20 of tape as illustrated in FIG. 1. These lengths, 1 and 2, are disposed in widthwise congruent but lengthwise offset relationship as shown in FIGS. 2 and 3, with the adhesive coatings, 1a and 2a, in intimate face-to-face relationship to thus form a laminate with opposing facing adhesive coated tabs, 3 and 4, at the ends of the laminate. The intermediate laminate is then positioned around the pulleys, 5 and 6, between which it is desired to transmit power, as shown in FIG. 4, and the tabs pressed together to complete the belt.

While the tape lengths are suitably severed from a tape roll as described above, this is of course not essential. Again, while it is not essential, the tape segments, 1 and 2, used should be of equal length so that the tabs, 3 and 4, will be of equal length. Thus when the belt is completed, the tabs may be positioned in congruent lengthwise relationship and, as shown in FIG. 5, the splice area of the belt will be virtually undistinguishable from the remainder of the belt.

Thus, belts of any length may be installed on the machine as needed from adhesive tape on hand and without any complicated splicing techniques and without requiring any stretching of a completed belt during installation. If it is desired for some reason that the belt be stretchable, stretchable tape may be utilized and the belt completed prior to installation. The method is equally applicable and even more useful where the opposite surfaces of the belt desirably have different frictional or other characteristics, strips of adhesive tapes having suitable backings simply being chosen.

The method may be used to form belts for both temporary and long term use, the length of life depending on the backings of the tapes chosen. Tapes utilizing any backing material may be used. For heavy duty, high speed uses, cloth backed tapes are preferred. For strength, strand reinforced strapping tapes or tapes having highly oriented polymeric film backings and the like may be used. Elastomeric tape backings would be chosen when forming stretchable belts.

Likewise, tapes utilizing any adhesive may be used in this method, however, pressure sensitive adhesives which are highly cohesive are preferred.

While the invention is being described with particularly utilizing pressure sensitive adhesive tapes and while the invention is most advantageous when these tapes are used, moisture sensitive and heat sensitive adhesive tapes could also be used. Likewise, one adhesive tape and one non-adhesive sheet may be used as will be apparent from the drawings.

The completed belts

As pointed out above the completed belts may have a variety of characteristics depending on the tapes used. In general, the belts have two main advantages over prior art belts, namely, (1) they may be extremely thin and light in weight and (2) they may be uniform along their entire length.

The thickness and weight of the belt is dependent on the tapes chosen to form the belt and on the number of plies of tape used to form the belt. For example, referring to FIG. 4, a third length of tape could be disposed over the outer surface, 9, of the belt. Alternatively, rather than having the ends of the tape segments abut as shown at 7 and 8 in FIG. 5, the ends, 3 and 4, may overlap the tape segment, 1 and 2 respectively, as shown in FIG. 6 at 10 and 11, and continue around one or more additional revolutions.

When the tape segments are of equal length and the tabs, 3 and 4, are aligned congruently to complete the belt as shown in FIGS. 4 and 5, the belt is essentially uniform along its entire length. In fact, it is uniform except for the very small slits, 7 and 8, adjacent the splice area. The two belt layers, 1 and 2, and the adhesive layers, 1a and 2a, are for all practical purposes continuous lengthwise and widthwise and have a uniform cross section along the entire length of the belt. Thus, essentially no discontinuities exist to influence the belt path when the same is in use.

The offset between the ends of the two tape segments and the resulting splice overlap are of course infinitely variable, but an overlap of from about 2 to about 6 inches is most often used. If the lap is less than 2 inches, the joint may lack the requisite strength, while little advantage is derived from using a lap of much more than 6 inches.

Since thin tapes are generally used, belt uniformity, while impaired, is still definitely acceptable and better than that provided in the prior art if the tabs, 3 and 4, of a given tape, 1 and 2, overlap by several inches the outer surface, 9, of the tape at its opposite end as shown in FIG. 6. As can be seen from the data which follows, the strength of the splice may be increased by utilizing such an overlap.

The belts provided have superior tensile strength, the strength being essentially equal to that of the strongest of the two tape segments used. Tensile strength tests are made using the Thwing-Albert Tensile Tester. Five different arrangements are tested: (1) a single strip of tape, more completely described below; (2) a double strip of the same tape; (3) a double strip of tape having a 2½ inch splice with a straight cut (as in FIG. 5); (4) the same arrangement as in (3) except with a diagonal cut; and (5) the same arrangement as in (3) with an added one-inch overlap on each side as in FIG. 6 of the drawings.

The Thwing-Albert Tensile Tester was operated at a 100 pound capacity and a jaw separation of five inches. All of the strips used are ¾" wide and 7" long. The following results are obtained:

| Sample | (1) Single strip | (2) Double strip | (3) Straight cut splice | (4) Diagonal cut splice | (5) Added overlap |
| --- | --- | --- | --- | --- | --- |
| A | 44.8 | 65.6 | 44.4 | 44.6 | 56.0 |
| B | 43.0 | 68.0 | 46.4 | 44.6 | 59.0 |
| C | 41.2 | 71.0 | 44.0 | 44.6 | 65.0 |
| D | 36.8 | 77.0 | 41.6 | 46.0 | 56.0 |
| E | 44.6 | 63.0 | 43.6 | 43.0 | 66.8 |
| Average | 42.0 | 68.9 | 44.0 | 44.5 | 60.5 |

During the testing, it is noted that all of the samples of arrangements (3) and (4) break at the splice. In the test using arrangement (5) with the overlapped strips, the samples break at the splices and at the same time pull apart at the point where the strips overlap.

The durability of these belts may be seen from tests with a 60 inch long belt fashioned from the same tapes used for the preceding test having a 6 inch splice. These tapes have a 56 x 48 woven cotton backing having on one surface a 0.8 ounce per square yard Buna N barrier coating covered by 1.5 ounce per square yard of polyvinyl chloride, and on the opposite surface 4.5 ounce per square yard of a conventional reclaimed rubber based adhesive tackified with a beta pinene polymer resin. These tapes are sold as P-691 by the Permacel Tape Company.

The belt is used to convey power between a 5 inch drive pulley and two ½ inch spindles. The drive pulley rotated at 3450 r.p.m. and the spindles at 34,500 r.p.m. for a belt speed of 4514 feet per minute. The output of the motor was ⅓ H.P. This drive belt has thus run satisfactorily for over 100 hours with no indication of wear.

What is claimed is:

1. A power transmission belt comprising a laminated structure formed from two substantially identical segments of pressure sensitive tape adhered together in an offset lengthwise relationship.

2. The belt of claim 1 wherein the offset lengthwise relationship of the segments creates outwardly extending adhesive coated tabs that are secured together to form the endless belt.

3. The belt of claim 2 wherein the ends of the segments are substantially perpendicular to the longitudinal edges of the segments and form uniform abutting surfaces.

References Cited

UNITED STATES PATENTS

| | | | |
|---|---|---|---|
| 385,613 | 7/1888 | Gingras | 74—232 |
| 2,294,088 | 8/1942 | Kholos | 74—232 XR |
| 2,426,257 | 8/1947 | Ziegler | 161—167 |
| 2,753,285 | 7/1956 | Pahl et al. | 161—167 XR |
| 2,882,183 | 4/1959 | Bond et al. | 161—167 XR |
| 3,135,642 | 6/1964 | Ruffer | 161—167 XR |

FOREIGN PATENTS 755,266  8/1956  Great Britain.

FRED C. MATTERN, JR., *Primary Examiner.*

JAMES A. WONG, *Assistant Examiner.*

U.S. Cl. X.R.

161—137